UNITED STATES PATENT OFFICE.

JAKOB SCHMID AND HERMANN REY, OF BASLE, SWITZERLAND, ASSIGNORS TO THE BADISCHE ANILIN AND SODA FABRIK, OF LUDWIGSHAFEN, GERMANY.

SULFONATED MONOBENZYL-PHTHALEIN DYE.

SPECIFICATION forming part of Letters Patent No. 609,998, dated August 30, 1898.

Application filed December 28, 1897. Serial No. 663,900. (Specimens.) Patented in France October 31, 1887, No. 186,697.

*To all whom it may concern:*

Be it known that we, JAKOB SCHMID and HERMANN REY, chemists, citizens of the Swiss Republic, and residents of Basle, Switzerland, have invented certain new and useful Improvements in the Manufacture of Dyestuffs of the Phthalein Series, (which improvements have been patented in France by Letters Patent of Addition, dated February 7, 1897, to Letters Patent No. 186,697, dated October 31, 1887,) of which the following is a clear and complete specification.

We have found that the product resulting from the condensation of one molecule phthalic anhydrid with one molecule of a benzylalkylmetaämidophenol can be applied to the preparation of a valuable sulfonated monobenzylphthalein dye, which is soluble in water and dyes the textile fibers in fiery-red tints.

*Par. I. Manufacture of the condensation product derived from one molecule phthalic anhydrid and one molecule of a benzylalkylmetaämidophenol.*—Forty-five parts of ethylbenzylmetaämidophenol are melted together with thirty parts of phthalic anhydrid, care being taken that the temperature does not rise higher than from 130° to 140° centigrade. The molten mass thus obtained is dissolved in an aqueous solution of sodium carbonate and precipitated from this solution after filtration by means of acetic acid. An analogous product of condensation is obtained if the ethylbenzylmetaämidophenol be replaced by methylbenzylmetaämidophenol.

*Par. II. Manufacture of the monobenzylated phthalein dye.*—9.5 parts of the condensation product derived from one molecule phthalic anhydrid and one molecule ethylbenzylmetaämidophenol, 4.2 parts of diethylmetaamidophenol, and 8 parts of potassium bisulfate are mixed intimately and heated together in a suitable vessel for one hour at a temperature of 175° centigrade, taking care to stir continuously. The mixture commences to melt about 90° centigrade and takes between 165° to 175° centigrade a beautiful brassy luster. After heating for one hour at 175° centigrade the molten mass becomes so viscous that it can hardly be stirred any longer. After cooling the mass is pulverized and boiled repeatedly with water to extract the potassium sulfate and bisulfate which has not been decomposed. The resinous residue is then dried and pulverized and constitutes a brick-red powder insoluble in water, but soluble in alcohol, with a yellow-red coloration and a splendid yellow-green fluorescence. It dissolves in concentrated sulfuric acid with a yellow coloration and green fluorescence. By adding water to its solution in concentrated sulfuric acid the dyestuff is precipitated in the form of red flocks. In this preparation of the monobenzylated phthalein dye the diethylmetaämidophenol can be replaced by an equivalent quantity of another meta-substituted phenol not benzylated—as resorcinol, monoethylmetaämidophenol, dimethylmetaamidophenol, monomethylmetaämidophenol, orthotolylmetaämidophenol, &c. It is obvious that the same monobenzylated phthalein dye can also be obtained by condensing first one molecule of phthalic anhydrid with one molecule of dimethylmetaämidophenol or diethylmetaämidophenol and afterward combining the condensation product thus obtained with a benzylated metaämidophenol.

*Par. III. Transformation of the monobenzylated phthalein dye into an alkaline sulfonate.*—One part of the sulfate of the monobenzylated phthalein dye obtained as described in Par. II is dissolved in five parts of fuming sulfuric acid of thirty per cent. of anhydrid, taking care by cooling to prevent the temperature of the mixture from rising above 15° centigrade. The resulting solution is poured into ice-water and the precipitated sulfo-acid of the monobenzylated phthalein dye thus obtained is transformed in sodium salt by dissolving it in hot water containing the necessary quantity of sodium carbonate and by precipitating the dyestuff from this solution by common salt. The sulfomonobenzylated phthalein dye thus obtained is a dark-red powder, readily soluble in water with crimson-red coloration and yellow fluorescence and dyes wool and silk in fiery-red tints. It dissolves with difficulty in alcohol and does not dissolve in ether and benzene.

The sulfonation of the monobenzylated phthalein dye can also be effected by heating it with concentated or English sulfuric acid—for example, one part of the monobenzylated phthalein dye, obtained as described into Par. II, is heated with seven parts of concentrated or English sulfuric acid on a water-bath until a sample taken from the mass dissolves in an aqueous solution of sodium carbonate, which happens at the end of a short time. The mass is then poured in about ten parts water. After filtering the sulfo-acid of the dyestuff is isolated and transformed in the sodium salt and is a brick-red powder soluble in water with crimson-red coloration and dyes tannin mordanted cotton in fiery-red tints.

Having thus described our invention, we claim—

1. The improvement in the manufacture of dyestuffs of the phthalein series, which consists in condensing one molecule of phthalic anhydrid with one molecule of a benzylalkylmetaämidophenol, by melting these substances together, as described.

2. The improvement in the manufacture of dyestuffs of the phthalein series, which consists in condensing one molecule of the product resulting from the condensation of equivalent quantities of phthalic anhydrid and of a benzylalkylmetaämidophenol, with one molecule of a meta-substituted phenol, such as specified, as described.

3. The improvement in the manufacture of dyestuffs of the phthalein series, which consists in condensing one molecule of the product resulting from the condensation of equivalent quantities of phthalic anhydrid and of a benzylalkylmetaämidophenol, with one molecule of a meta-substituted phenol, such as specified, then converting the monobenzylated-phthalein dye thus obtained into sulfo-acid by treating it with sulfuric acid and finally converting the resulting sulfo-acid in an alkaline salt, as described.

4. As a new article of manufacture the herein-described dyestuff, which is the alkaline sulfonate of a monobenzylated-phthalein dye, dyeing textile fibers in fiery-red tints and being a red powder, which is soluble in water with a red coloration and a yellowish fluorescence, with difficulty soluble in alcohol and insoluble in ether and benzene.

In witness whereof we have hereunto signed our names in the presence of two subscribing witnesses.

JAKOB SCHMID.
HERMANN REY.

Witnesses:
  GEORGE GIFFORD,
  AMAND RELB.